Nov. 29, 1960     J. F. McCASHEN     2,962,029
METHOD OF STRIPPING LEAVES FROM TOBACCO STALKS
Filed Sept. 29, 1958

INVENTOR.
JAMES F. McCASHEN
BY
WATTS & EDGERTON
ATTORNEYS

United States Patent Office 2,962,029
Patented Nov. 29, 1960

2,962,029

METHOD OF STRIPPING LEAVES FROM TOBACCO STALKS

James F. McCashen, 19030 W. Lake Road, Cleveland 16, Ohio

Filed Sept. 29, 1958, Ser. No. 764,179

3 Claims. (Cl. 131—131)

This invention is particularly concerned with a new method of stripping tobacco leaves from their stalks.

Heretofore, tobacco leaves have been stripped from stalks by hand. This method is not entirely satisfactory because many of the leaves are torn or incompletely removed from the stalks, and also because the labor costs for this work is high.

Various efforts have been made to devise apparatus for stripping tobacco leaves from the stalks but, so far as I am aware, none of the proposed devices has attained any appreciable commercial success.

The present invention aims to provide a method of removing tobacco leaves from their stalks and separating and segregating the leaves and the stalks. This method may be performed mechanically, rapidly and inexpensively.

Briefly described, this method comprises the steps of moving the moistened tobacco stalks with leaves attached in an arcuate path under centrifugal force, removing substantially all the leaves from the stalks while they are so moving, discharging the stalks and leaves from the said path, and separating the stalks from the leaves.

The detached stalks with the attached leaves, as they come from the curing barns are moistened with water to the usual extent required for hand stripping which makes the stalks and leaves soft and pliable.

Then the stalks with leaves attached are subjected to centrifugal force sufficient to cause the stalks to move in an arcuate path having a horizontal axis. The stalks are brought into contact with rapidly moving obstructions which turn the stalks and orient them more or less lengthwise of the direction of travel and also detach the leaves from the stalks. Since the obstructions may also cut the leaves, it is preferable to rotate the obstructions at a speed not much higher than is required to remove the leaves from the stalks for at that speed the obstructions will encounter any leaf the minimum number of times and hence will leave the leaf in the largest sized pieces.

After the leaves have been detached from the stalks, both continue to move in the arcuate path until intercepted and discharged laterally from the arcuate path. Since the discharge velocity of the stalks and leaves is low and the weights are quite different, the stalks will not travel far and hence they may be collected adjacent to the arcuate path. However, the leaves, which are light in weight, will travel farther and may be collected in a pile beyond and separate from the stalks or on a conveyor which can transport them to a place where they are to be subjected to further treatment.

Apparatus suitable for carrying out the present process is shown somewhat diagrammatically in the drawings attached to and forming a part of this specification and in which.

Figure 1:
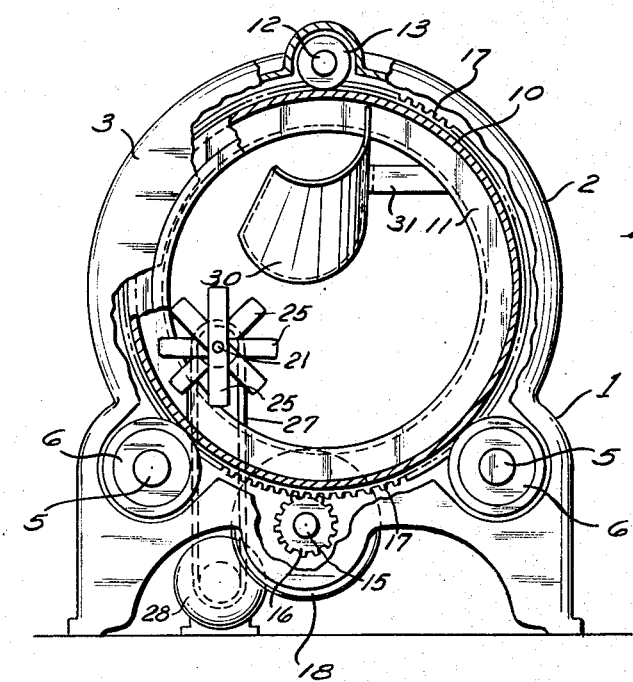
Figure 1 is an end view partly in section, showing one form of such apparatus.
Figure 2:
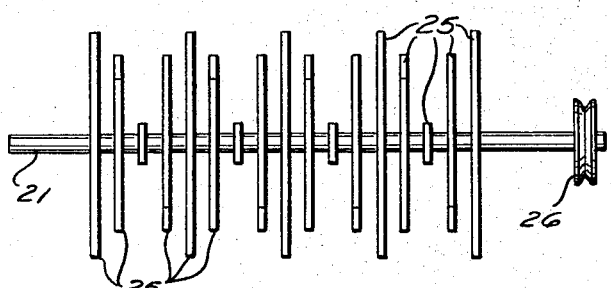
Figure 2 is a side elevational view of the blade mechanism shown in Figure 1.
Figure 3:
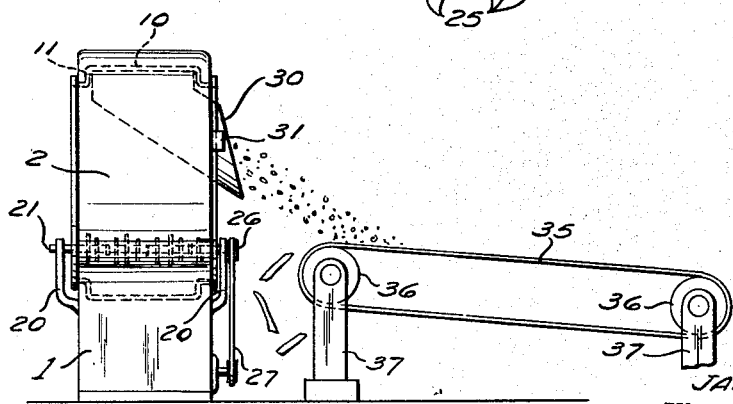
Figure 3 is an end elevation of the apparatus of Figure 1 shown in cooperative position with a leaf conveyor.

The apparatus shown in Figures 1 to 3 comprises a housing 1 adapted to rest on a floor or other suitable foundation and having a generally cylindrical part 2 provided with parallel, inwardly extending, radially short flanges 3, defining a horizontal opening therethrough. The housing supports shafts 5 on which rollers 6 are mounted in pairs to support a drum. These shafts are preferably disposed about 120° apart and about 60° on either side of a vertical plane passing centrally through the housing 1. A drum comprising a cylinder 10 and flanges 11, constituting parallel side walls at each end of cylinder 10, is disposed in housing 1 with the cylinder 10 resting on the rollers 6 and with the flanges 11 extending over the inner edge, and down on the outer sides of, flanges 3 of housing 2. Shaft 12 disposed on the vertical center line of the housing carries one or more rollers 13 which bear on the outer surface of cylinder 10 and hold it down onto rollers 6. A shaft 15 journaled in bearing carried by housing 1 is provided with one or, if desired, two pinions 16 to engage with a rack or racks 17 on the outside of cylinder 10. Shaft 15 may be rotated by motor 18 housed within or carried by housing 1.

The housing has brackets 20 attached thereto in which is journaled a horizontal shaft 21 which has a plurality of long, thin, narrow metal blades 25 attached thereto and arranged substantially as shown in Figures 1 and 2. A pulley 26 fastened to one end of shaft 21 is driven by a belt 27 which is driven by a motor 28 resting on the foundation on which housing 1 rests. A scraper 30 is supported by a bracket 31 from the housing and is disposed to intercept the stalks and leaves carried by the drum and direct them through one end of the drum, as is indicated in Figure 3.

And endless belt 35 extends around rollers 36 carried by suitable supports 37 and serves to catch leaves discharged from the drum by scraper 30 and transport them away from the apparatus of Figure 1.

The present method may be carried out by operating the above described apparatus substantially as follows.

Motors 18 and 28 are energized and rotate the drum and shaft 21. Preferably, the shaft 21 is rotated at such a speed that the linear velocity of the blades 25 is considerably greater than the linear velocity of the cylinder 10. When moistened, soft and pliable tobacco stalks with leaves attached are charged into the drum between flanges 11 and in advance of the blades 25 and into engagement with the downwardly moving part of cylinder 10, the stalks and leaves will be subjected to centrifugal force and will move clockwise with the drum. As they come into contact with the blades 25, each stalk will be struck successively by the circumferentially spaced more rapidly rotating blades and will be oriented more or less into parallelism with the direction of travel of the cylinder and with the blades. As the blades 25 come into contact with the leaves, they will sever the leaves from the stalks. Since it is desirable that the severed leaves should be of the largest possible size, the lineal speed of the blades should be such that the blades will strike a given leaf the minimum number of times consistent with separating of the leaf from the stalk.

Satisfactory results have been attained with a drum which had a radius of about 17", a rotational speed of about 140 r.p.m. and a lineal speed of about 535 feet per minute and with blades 25 which were about 7" long and had a rotational speed of 1750 r.p.m. It will be understood that with drums of larger diameters and blades of greater lengths, these velocities may vary widely from the foregoing values but that satisfactory results may be obtained when, as stated above, the lineal speed of the blades is enough greater than that of the drum to sever the leaves from the stalks with a minimum number of contacts with the leaves.

After the leaves have been severed from the stalks and both have passed beyond blades 25, they continue on their travel in the arcuate path under centrifugal force until they are intercepted by scraper 30 and are thereby diverted through the end of the drum. Since the velocity of the stalks and leaves is greatly reduced by the scraper and since the stalks are heavier than the leaves, the stalks will travel only a short distance beyond the end of the scraper and may be collected in a pile adjacent to the housing 1. Since the leaves are much lighter than the stalks, their velocity will carry them farther away from the housing and they may be caught on endless conveyor 35. Thus, the stalks may be separated from the leaves and collected in one place and the leaves may be collected in another place.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of stripping tobacco leaves from their stalks which comprises the steps of wetting the stalks and attached leaves sufficient to make them soft and pliable, moving the thus moistened stalks and leaves in an arcuate path about a substantially horizontal axis under centrifugal force and while so moving, orienting the stalks somewhat in parallelism to their direction of travel and detaching the leaves from the stalks and discharging the stalks laterally out of said path.

2. The method of stripping tobacco leaves from their stalks which comprises the steps of wetting the stalks and attached leaves sufficient to make them soft and pliable, moving the thus moistened stalks and leaves in an arcuate path about a substantially horizontal axis under centrifugal force and while so moving, bringing the stalks and leaves into contact with rotating blades and thereby detaching the leaves from the stalks and then discharging the stalks and leaves laterally from said path.

3. The method of stripping tobacco leaves from their stalks which comprises the steps of wetting the stalks and attached leaves sufficient to make them soft and pliable, moving the thus moistened stalks and leaves in an arcuate path about a substantially horizontal axis under centrifugal force and while so moving, bringing them into contact with rotating blades thereby partly positioning the stalks lengthwise of the direction of travel and detaching the leaves from the stalks, discharging the stalks and leaves laterally out of the arcuate path and then at an angle thereto with sufficient velocity to separate the stalks from the leaves and collect separately.

References Cited in the file of this patent

UNITED STATES PATENTS

| | | |
|---|---|---|
| 96,257 | Muller | Oct. 26, 1869 |
| 1,219,416 | Ryder | Mar. 13, 1917 |
| 2,667,174 | Eissmann | Jan. 26, 1954 |